United States Patent
Kim et al.

(10) Patent No.: US 8,533,627 B2
(45) Date of Patent: Sep. 10, 2013

(54) DISPLAY APPARATUS AND CONTROL METHOD THEREOF

(75) Inventors: Byuk-sun Kim, Seoul (KR); Yong-deok Kim, Uiwang-si (KR); Hye-jeong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 13/104,512

(22) Filed: May 10, 2011

(65) Prior Publication Data

US 2012/0089944 A1    Apr. 12, 2012

(30) Foreign Application Priority Data

Oct. 7, 2010    (KR) ................ 10-2010-0097662

(51) Int. Cl.
*G06F 3/048*    (2013.01)

(52) U.S. Cl.
USPC ........................................ 715/810

(58) Field of Classification Search
USPC ................. 715/810, 821, 823, 854
See application file for complete search history.

(56) References Cited

U.S. PATENT DOCUMENTS

| | | | |
|---|---|---|---|
| 5,945,991 A | 8/1999 | Britt et al. | |
| 6,072,485 A | 6/2000 | Barnes et al. | |
| 6,133,913 A | 10/2000 | White et al. | |
| 6,229,532 B1* | 5/2001 | Fujii | 715/733 |
| 7,546,551 B2* | 6/2009 | Sakata et al. | 715/841 |
| 7,681,128 B2* | 3/2010 | Yamamoto et al. | 715/717 |
| 8,065,633 B2* | 11/2011 | Hirose | 715/838 |
| 8,120,580 B2* | 2/2012 | Yamaji et al. | 345/161 |
| 2001/0017634 A1* | 8/2001 | Scott | 345/767 |
| 2002/0023271 A1 | 2/2002 | Augenbraun et al. | |
| 2005/0220366 A1* | 10/2005 | Watanabe et al. | 382/305 |
| 2008/0163129 A1* | 7/2008 | Lee et al. | 715/859 |
| 2010/0299606 A1* | 11/2010 | Morita | 715/738 |
| 2012/0060094 A1* | 3/2012 | Irwin et al. | 715/719 |

FOREIGN PATENT DOCUMENTS

| | | |
|---|---|---|
| EP | 0203324 A2 | 12/1986 |
| EP | 0903938 A1 | 3/1999 |
| GB | 2357945 A | 7/2001 |
| GB | 2408435 A | 5/2005 |
| KR | 1998-007677 A | 3/1998 |
| WO | 97/49044 A1 | 12/1997 |

OTHER PUBLICATIONS

Search Report issued Mar. 14, 2012 by the European Patent Office in counterpart European Application No. 11164993.5.

* cited by examiner

*Primary Examiner* — Omar Abdul-Ali
(74) *Attorney, Agent, or Firm* — Sughrue Mion, PLLC

(57) ABSTRACT

Disclosed are a display apparatus and a control method thereof, the display apparatus including: a display unit; an image receiver which receives an image signal; an image processor which processes the image signal received by the image receiver and displays an image corresponding to the processed image signal on the display unit; and a controller which maps a plurality of objects in the image displayed on the display unit corresponding to four directions including up, down, right, and left, and controls the image processor so that a second object corresponding to a same row as a first object is selected when a first transfer command instructing a transfer in a right or left direction is received through up, down, right, and left keys with the first object being selected among the plurality of objects.

15 Claims, 7 Drawing Sheets

DISPLAY APPARATUS AND CONTROL METHOD THEREOF

CROSS-REFERENCE TO RELATED APPLICATION

This application claims priority from Korean Patent Application No. 10-2010-0097662, filed on Oct. 7, 2010 in the Korean Intellectual Property Office, the disclosure of which is incorporated herein in its entirety by reference.

BACKGROUND

1. Field

Apparatuses and methods consistent with exemplary embodiments relate to a display apparatus which receives and processes an image signal to display an image, and a control method thereof, and more particularly, to a display apparatus having an improved structure of selecting an object displayed in an image by a user, and a control method thereof.

2. Description of the Related Art

A display apparatus processes an image signal received from the outside to display an image corresponding to the processed image signal, and is configured as various types, such as a TV, a monitor, a portable media player, an electronic frame, and the like. For example, a display apparatus configured as a TV receives a broadcasting signal transmitted from a broadcasting station and performs a process, such as tuning and decoding, on the broadcasting signal to display a broadcast image of a channel on a display unit.

The display apparatus is configured to have various integrated operations in addition to display of a general broadcast image. For example, the display apparatus may be connected to a server through a network to display a web content image of a website. In this case, the web content image may include various link items or objects realized in hypertexts or icons, and an object may be selected and implemented by transferring a cursor or pointer to a position of the object or by changing a selection from one object to another. Accordingly, web contents or preset information corresponding to the object may be displayed.

SUMMARY

Accordingly, one or more exemplary embodiments provide a display apparatus having an improved structure of selecting an object displayed in an image by a user, and a control method thereof.

According to an aspect of an exemplary embodiment, there is provided a display apparatus including: a display unit; an image receiver which receives an image signal; an image processor which processes the image signal received by the image receiver and displays an image on the display unit; and a controller which maps a plurality of objects in the image displayed on the display unit corresponding to four directions including up, down, right, and left, and controls the image processor so that a second object corresponding to a same row as a first object is selected, according to the mapped plurality of objects, in response to a first transfer command instructing a transfer in a first direction received through a user input, to a user input unit, of a directional signal corresponding to the first direction with the first object being selected among the plurality of objects, the first direction being one of the right direction and the left direction.

The controller may select a leftmost object among objects corresponding to a second row downwardly adjacent to a first row when there is no object corresponding to the first row, which is the same row as the first object, when the first transfer command is received.

The plurality of objects may be mapped corresponding to a plurality of rows based on object sizes, and the controller may select a third object which corresponds to the same row as the first object and is relatively closest to the second object when a second transfer command instructing a transfer in the first direction is received with the second object being selected.

The controller may select a fourth object which corresponds to the same row as the first object and is relatively closest to the first object among objects corresponding to a second row next to the first row corresponding to the first object when a third transfer command instructing a transfer in an upward direction or a downward direction is received.

The controller may sequentially and changeably select objects which are relatively closest to the fourth object among the objects corresponding to the second row when a fourth transfer command instructing a transfer in a same direction as the third transfer command is received with the fourth object being selected.

The image receiver may receive web content data from a server, and the image processor may display, on the display unit, a web content image based on the received web content data.

The display apparatus may further include the user input unit including up, down, right, and left keys and transmitting a transfer command to the controller based on a manipulation of the up, down, right, and left keys.

The user input unit may include a remote controller.

According to an aspect of another exemplary embodiment, there is provided a control method of an image processing apparatus, the control method including: controlling to display, on a display unit, an image including a plurality of objects; mapping the plurality of objects in the image corresponding to four directions including up, down, right, and left; and controlling to display, according to the mapped plurality of objects, a selection of a second object corresponding to a same row as a first object in response to a first transfer command instructing a transfer in a first direction received through a user input of a direction signal corresponding to the first direction with the first object being selected among the plurality of objects, the first direction being one of the right direction and the left direction.

The control method may further include controlling to display a selection of a leftmost object among objects corresponding to a second row downwardly adjacent to a first row when there is no object corresponding to the first row, which is the same row as the first object, when the first transfer command is received.

The mapping the plurality of objects corresponding to the four directions may include mapping the plurality of objects to correspond to a plurality of rows based on object sizes, and the control method may further include controlling to display a selection of a third object which corresponds to the same row as the first object and is relatively closest to the second object when a second transfer command instructing a transfer in the first direction is received with the second object being selected.

The controlling to display the selection of the second object may include controlling to display a selection of a fourth object which corresponds to the same row as the first object and is relatively closest to the first object among objects corresponding to a second row next to the first row corresponding to the first object when a third transfer command instructing a transfer in an upward direction or a downward direction is received.

The controlling to display the selection of the fourth object may include controlling to display a sequential and changeable selection of objects which are relatively closest to the fourth object among the objects corresponding to the second row when a fourth transfer command instructing a transfer in a same direction as the third transfer command is received with the fourth object being selected.

The controlling to display the image including the plurality of objects may include receiving web content data from a server, and controlling to display, on the display unit, a web content image based on the received web content data.

According to an aspect of another exemplary embodiment, there is provided an image processing apparatus including: an image processor which processes an image signal to be displayed, on a display unit, as an image; and a controller which maps a plurality of objects in the image corresponding to four directions including up, down, right, and left, and controls the image processor so that a second object corresponding to a same row as a first object is selected, according to the mapped plurality of objects, in response to a first transfer command instructing a transfer in a first direction received through a user input, to a user input unit, of a directional signal corresponding to the first direction with the first object being selected among the plurality of objects, the first direction being one of the right direction and the left direction.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
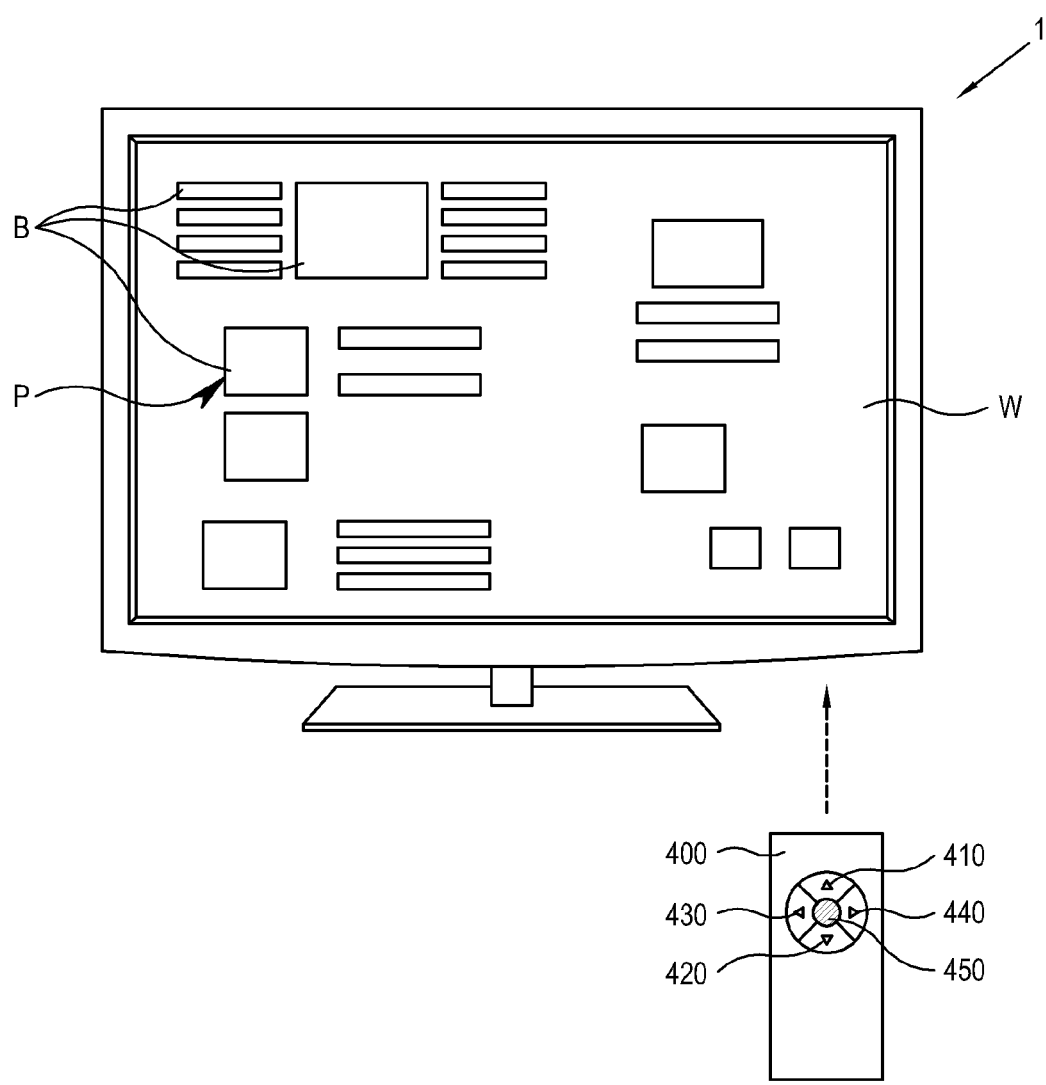
FIG. 1 illustrates an example of a display apparatus according to a first exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

Exemplary embodiments are described with the display apparatus 1 configured as a TV, though it is understood that other exemplary embodiments are not limited thereto. Exemplary embodiments may be applicable to a display apparatus 1 which is capable of changing a selection with respect to any object of a plurality of objects in an image corresponding to a manipulation of up, down, right, and left direction keys, and thus exemplary embodiments may be realized as various types of display apparatuses, such as a portable media player, a mobile phone, etc., in addition to a TV. Furthermore, while exemplary embodiments described herein are with reference to a display apparatus, it is understood that other exemplary embodiments are not limited thereto, and may be applied to any image processing apparatus, including those without a display unit (such as a set-top box, an optical recording medium or multimedia player, etc.).

FIG. 1 illustrates an example of a display apparatus 1 according to a first exemplary embodiment.

As shown in FIG. 1, the display apparatus 1 displays an image W based on an image signal/image data received from the outside. In the present exemplary embodiment, the display apparatus 1 is connected to a server (not shown) via a network, and the image W includes web content images based on web contents data received by the display apparatus 1 from the server. However, the image W is not limited thereto and may include broadcasting images based on broadcasting signals transmitted from a broadcasting station.

The image W displayed by the display apparatus 1 includes a plurality of objects B. When the image W is a web content image, the plurality of objects B may be configured as various types, such as a text including a hyperlink, an image, a video, etc. The image W includes a pointer P traveling between the respective objects B.

The display apparatus 1 includes a remote controller 400 manipulated by a user. The remote controller 400 includes four direction keys 410, 420, 430, and 440, such as, up, down, right, and left, to transfer the pointer P each time one direction key is pressed, and an enter key 450 to implement an operation corresponding to an object B selected by the pointer P currently being positioned thereon. A user manipulates the respective direction keys 410, 420, 430, and 440 to transfer the pointer P to select any object B and manipulates the enter key 450 to implement a preset operation corresponding to the selected object B.

That is, when the user manipulates one of the four direction keys 410, 420, 430, and 440 once, the pointer P is transferred from a currently indicated object B to another object B, and accordingly a selection of an object B is changed.

In the present exemplary embodiment, the pointer P is transferred to an object B to select the object B. However, it is understood that another exemplary embodiment is not limited thereto, and selection methods may vary. For example, instead of displaying the pointer P in the image W, a selected object B may be highlighted or framed.

Furthermore, in the present exemplary embodiment, the remote controller 400 is described to include four direction keys 410, 420, 430, and 440, such as, up, down, right, and left, to transfer the pointer P each time one direction key is pressed, and an enter key 450 to implement an operation corresponding to an object B selected by the pointer P currently being positioned thereon. However, it is understood that another exemplary embodiment is not limited to this configuration of input devices, and any input method to input each of four directions and to implement an operation corresponding to a selected object B may be used. For example, according to another exemplary embodiment, the remote controller 440 may include a touchscreen, a single input device that allows for multiple different inputs, a track pad, a mouse, etc.

Figure 2:
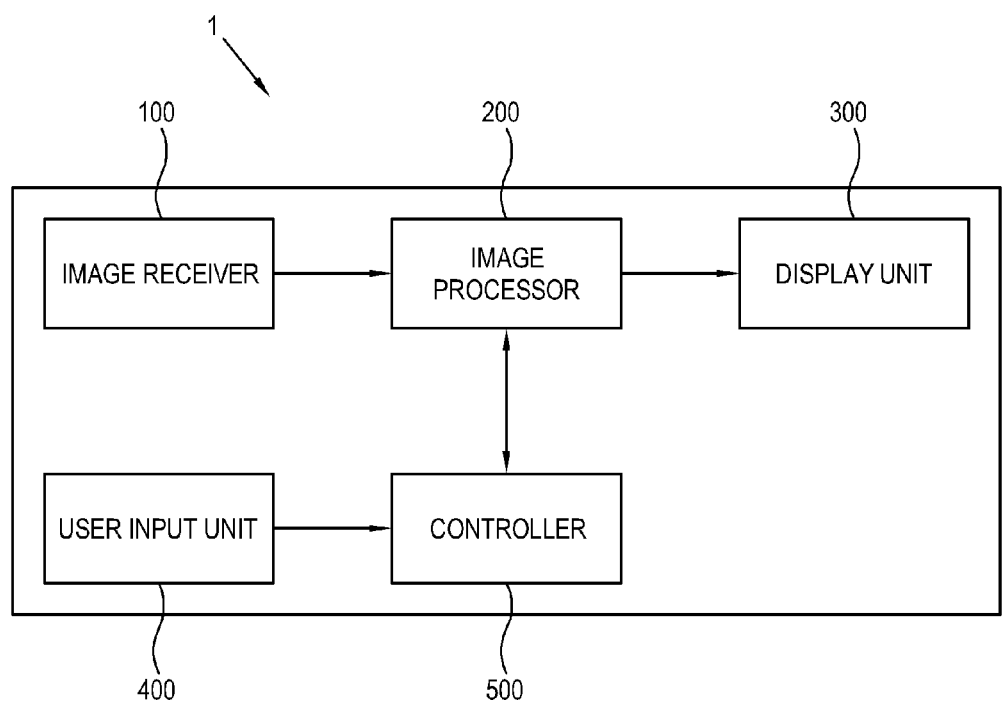
FIG. 2 is a block diagram of the display apparatus of FIG. 1.

Hereinafter, a configuration of the display apparatus 1 is further described with reference to FIG. 2. FIG. 2 is a block diagram of the display apparatus 1.

As shown in FIG. 2, the display apparatus 1 includes an image receiver 100 to receive an image signal from an outside, an image processor 200 to process the image signal received by the image receiver 100, a display unit 300 to display an image based on the image signal processed by the image processor 200, a user input unit 400 manipulated by a user to output a preset control signal, and a controller 500 to control the image processor 200 based on the control signal output from the user input unit 400.

The image receiver 100 may receive the image signal from any of various image sources (not shown), without limit, and transmits the signal to the image processor 200. The image receiver 100 may wirelessly receive a radio frequency (RF) signal transmitted from a broadcasting station or may receive image signals in composite video, component video, super video, SCART, high definition multimedia interface (HDMI) standards, etc., through a cable. Moreover, the image receiver 100 may be connected to a web server (not shown) to receive a data packet of web contents.

The image processor 200 performs various types of preset image processing on an image signal transmitted from the image receiver 100. The image processor 200 processes an image signal and outputs the signal to the display panel 130, so that an image is displayed on the display unit 300.

For example, the image processor 200 may perform, without limit, decoding corresponding to various image formats, de-interlacing, frame refresh rate conversion, scaling, noise reduction to improve image quality, detail enhancement, etc. The image processor 200 may be provided as a separate component to independently conduct each process or an integrated multi-functional component, such as a system on chip.

In addition, the image processor 200 includes a web browser operation, and processes a data packet of web contents to display a web content image on the display unit 300 when the data packet is received by the image receiver 100.

The display unit 300 displays an image based on an image signal output from the image processor 200. The display unit 300 may include, without limit, various types of display devices, such as a liquid crystal display, a plasma display, a light emitting diode display, an organic light emitting diode display, a surface conduction electron emitter display, a carbon nano-tube display, a nano-crystal display, etc.

An image displayed on the display unit 300 may include, without limit, a broadcasting program image, an electronic program guide (EPG), web contents, a user interface (UI) image, various applications, etc. The image displayed on the display unit 300 includes various objects, and the objects may be realized as various types, such as icons, symbols, texts, images, videos, and the like.

The user input unit 400 is configured as a remote controller including a plurality of keys or buttons. The user input unit 400 generates a preset control signal/command based on a user's manipulation, and transmits the command to the controller 50 based on any of various communication standards, such infrared rays, Zigbee, RF, Bluetooth, and the like.

In the present exemplary embodiment, the user input unit 400 is configured as the remote controller, though it is understood that another exemplary embodiment is not limited thereto. For example, according to another exemplary embodiment, the user input unit 400 may be configured on an external side of the display apparatus 1 (such as a plurality of keys on the external side of the display apparatus).

The user input unit 400 according to the present exemplary embodiment includes the four direction keys 410, 420, 430, and 440, such as up, down, right, and left, to transfer the pointer P in the image W or to change a selection of an object B. The user selectively manipulates one of the four direction keys 410, 420, 430, and 440 to change a selection from an object B currently selected to another object B.

When a transfer command by the four direction keys 410, 420, 430, and 440 is received from the user input unit 400, the controller 500 changeably selects the plurality of objects B in the image W displayed on the display unit 300 based on the received transfer command.

Figure 3:
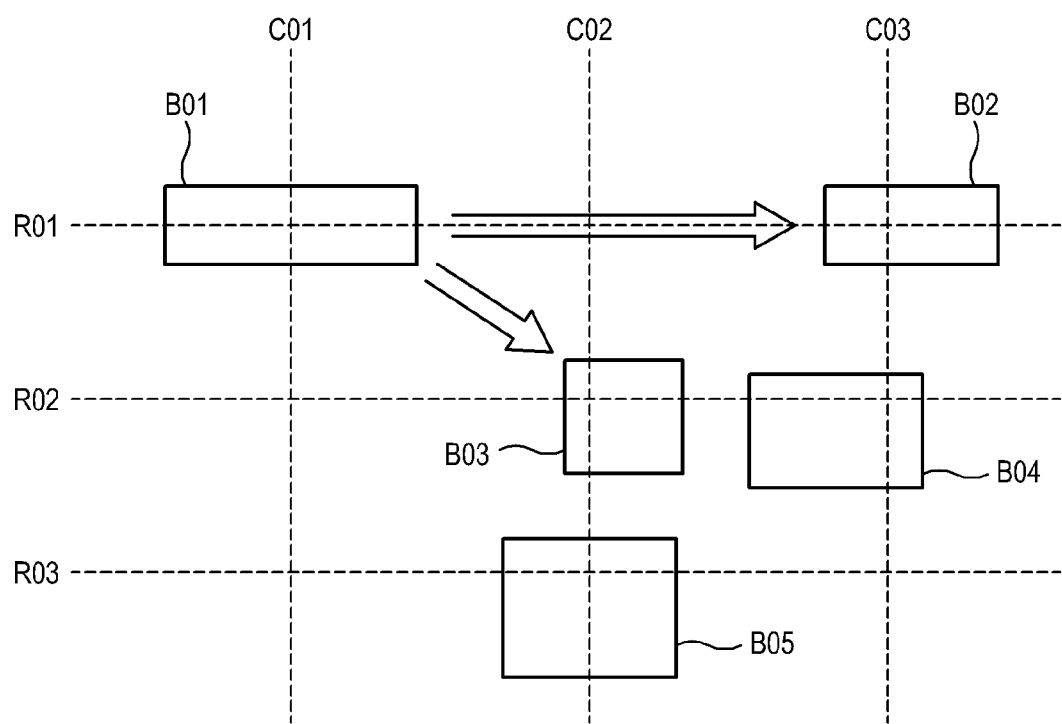
FIG. 3 illustrates an example of a method of changing a selection of an object in an image displayed in the display apparatus of FIG. 1 based on a rightward transfer command.

Hereinafter, a control operation of the controller 500 is further described with reference to FIG. 3. FIG. 3 illustrates an example of a method of changing a selection of objects B01, B02, B03, B04, and B05 in the image W displayed on the display unit 300 based on a rightward transfer command.

As shown in FIG. 3, in an initial state where an object B01 is selected, when the rightward transfer command is received from the user input unit 400, the controller 500 transfers the selection to an object that is to a right side of the object B01 based on the rightward transfer command.

Here, according to a related art technology, such as a World Wide Web Consortium (W3C), the selection is changed to an object B03 which is the closest to the object B01 among objects disposed on the right side of the object B01.

However, the user sequentially recognizes objects in accordance with a row. That is, the user may intuitively select a next object in the same row when sequentially recognizing the objects B01, B02, B03, B04, and B05. Thus, the related art technology which performs a transfer to an object which is close in distance may not properly adapt to the user's tendency described above.

According to the present exemplary embodiment, when the image W is displayed, the controller 500 maps the plurality of objects B01, B02, B03, B04, and B05 in the image W into a matrix structure corresponding to four directions, such as up, down, right, and left. When a transfer command instructing a transfer in an up, down, right, or left direction is received through the four direction keys 410, 420, 430, and 440 of the user input unit 400, the controller 500 controls the image processor 200 to changeably select an object B02 first in the same row as the currently selected object B01. Accordingly, the user may sequentially select the objects B01, B02, B03, B04, and B05 disposed substantially in the same row through a manipulation of the four direction keys 410, 420, 430, and 440 to intuitively select the objects B01, B02, B03, B04, and B05.

When the image W is displayed on the display unit 300, the controller 500 extracts the plurality of objects B01, B02, B03, B04, and B05 included in the image W. The controller 500 maps the objects B01, B02, B03, B04, and B05 into a matrix structure corresponding to four directions, such as up, down, right, and left, based on arranged relations between the extracted objects B01, B02, B03, B04, and B05 in the image W.

In FIG. 3, the respective objects B01, B02, B03, B04, and B05 correspond to a matrix of three rows R01, R02, and R03 and three columns C01, C02, and C03. Objects B01 and B02 correspond to a row R01, objects B03 and B04 correspond to a row R02, and an object B05 corresponds to a row R03. Further, the object B01 corresponds to a column C01, the objects B03 and B05 correspond to a column C02, and the objects B02 and B04 correspond to a column C03.

Here, as the matrix is structured based on the arranged relations between the objects B01, B02, B03, B04, and B05 in the image W, intervals between the respective rows R01, R02, and R03 and intervals between the respective columns C01, C02, and C03 are not limited particularly. The intervals between the respective rows R01, R02, and R03 or the intervals between the respective columns C01, C02, and C03 may be the same or different.

When the user presses a right key 440 of the user input unit 400 once with the object B01 being currently selected, the controller 500 performs a change to select the object B02 in the same row R01 as the object B01 based on the matrix of the objects B01, B02, B03, B04, and B05. When there is a plurality of objects in the row R01, the controller 500 selects an object that is the closest to the object B01 among the objects.

When a rightward transfer command is received from the user input unit 400 and there is no object in the same row R01 as the object B01, the controller 500 selects a leftmost object among objects in a row R02 next to the row R01. The selection is made based on a general tendency of user's recognition from up to down and from left to right.

Figure 4:
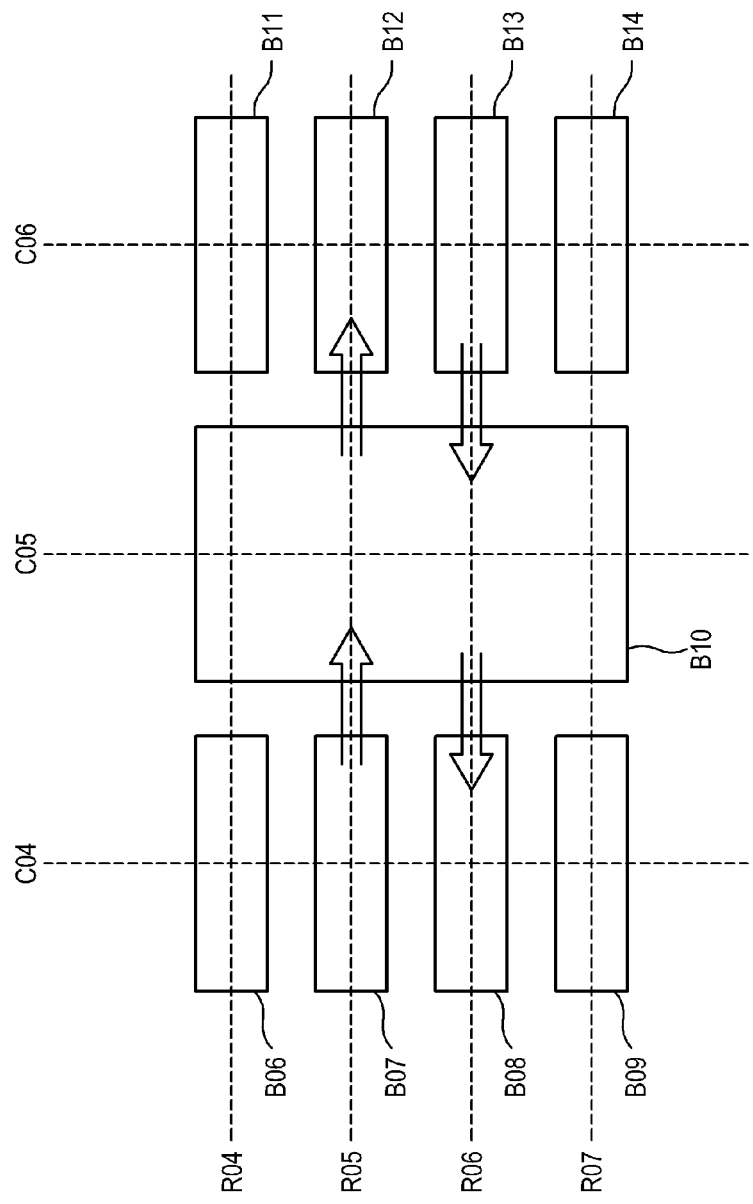
FIG. 4 illustrates an example of a method of changing a selection of an object having a different height based on a leftward or rightward transfer command, the object being in an image displayed according to a second exemplary embodiment.

Hereinafter, an operation of the controller 500 changing a selection of objects B06, B07, B08, B09, B10, B11, B12, B13, and B14 according to a second exemplary embodiment is described with reference to FIG. 4. FIG. 4 illustrates an example of a method of changing a selection of the objects B06, B07, B08, B09, B10, B11, B12, B13, and B14 in an image W based on a leftward or rightward transfer command according to the second exemplary embodiment.

As shown in FIG. 4, when the controller 500 maps the objects B06, B07, B08, B09, B10, B11, B12, B13, and B14 into a matrix structure, each of objects B06, B07, B08, B09, B11, B12, B13, and B14 respectively corresponds to each of rows R04, R05, R06, and R07, and each column C04, C05, and C06, as illustrated, except for an object B10.

However, the object B10 is mapped corresponding to a plurality of rows R04, R05, R06, and R07 due to a relative size and arranged relations with other objects.

For example, when a rightward transfer command is received with an object B07 being selected, the controller 500 identifies a row R05 corresponding to the object B07 and determines whether there is another object corresponding to the row R05. Objects B07, B10, and B12 correspond to the row R05, and the controller 500 transfers a selection to an object B10 which is the closest to the object B07 thereamong. The controller 500 remembers transferring the selection from the object B07.

Then, when the rightward transfer command instructing a transfer in the same direction as the previous process is received again, the controller 500 selects the row R05 corresponding to the object B07 selected in the previous process among the plurality of rows R04, R05, R06, and R07 corresponding to the object B10. The controller 500 transfers the selection to an object B12 that is the closest to B10 in the right direction among the objects corresponding to the row R05.

When the leftward transfer command is received after the selection is transferred from the object B07 to the object B10, the controller 500 transfers the selection to the object B07 which corresponds to the row R05 and is the closest to the object B10 in the left direction in the same manner as the above example.

In the same manner as described above, when the leftward transfer command is received successively twice with an object B13 being selected, the controller 500 sequentially transfers the selection from the object B13 corresponding to a row R06 to objects B10 and B08.

As described above, a predetermined first object may be mapped corresponding to a plurality of rows based on a difference in a relative size to another object. Also, when the same command instructing a transfer in a left or right direction as a transfer command in a previous process is received with the first object being selected, the controller 500 transfers a selection to another object which corresponds to the same row as an object selected in the previous process and is relatively close to the first object.

Figure 5:
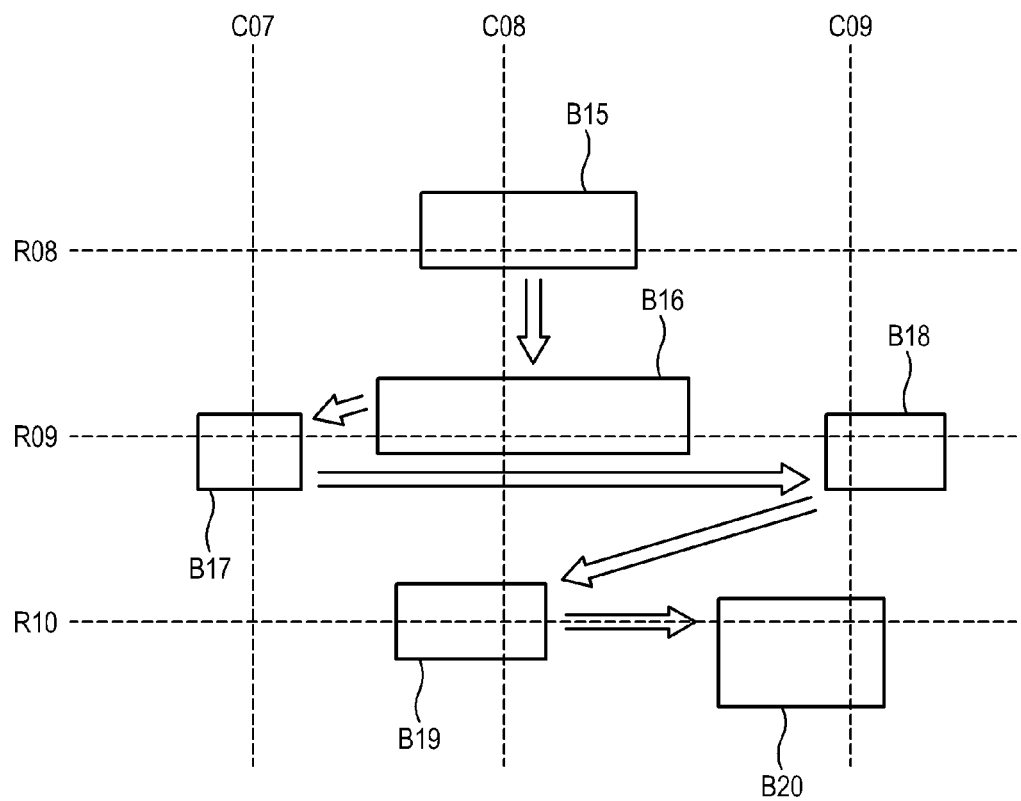
FIG. 5 illustrates an example of a method of changing a selection of an object based on a downward transfer command, the object being in an image displayed according to a third exemplary embodiment.

Hereinafter, an operation of the controller 500 changing a selection of objects B15, B16, B17, B18, B19, and B20 according to a third exemplary embodiment is described with reference to FIG. 5. FIG. 5 illustrates an example of a method of changing a selection of the objects B15, B16, B17, B18, B19, and B20 in an image W based on an upward or downward transfer command according to the third exemplary embodiment.

As shown in FIG. 5, the controller maps the objects B15, B16, B17, B18, B19, and B20 into rows R08, R09, and R10 and columns C07, C08, and C09.

When a downward transfer command is received with an object B15 being selected, the controller 500 determines an object corresponding to a row R09 downwardly next to a row R08 corresponding to the object B15. The controller 500 transfers the selection to an object B16 corresponding to the same column C08 as the object B15 among objects B16, B17, and B18 corresponding to the row R09. When there is a plurality of objects corresponding to the same column C08, the controller 500 transfers the selection to an object that is the closest to B15.

Next, when the downward transfer command is received again, the controller 500 transfers the selection to an object B17 which is the closest to the object B16 among the remaining objects B17 and B18 corresponding to the row R09.

Then, when the downward transfer command is successively received, the controller 500 sequentially transfers the selection to objects B18, B19, and B20 in the same manner as described above.

As described above, when an upward or downward transfer command is received, the controller 500 transfers a selection to a second object which corresponds to the same column as a first object and is relatively close to the first object among objects corresponding to a second row next to a first row corresponding to the first object. Further, when an upward or downward transfer command instructing a transfer in the same direction is received again, the controller 500 sequentially transfers the selection to an object which is relatively close to the second object among the remaining objects corresponding to the second row.

Hereinafter, a control method of the display apparatus 1 according to an exemplary embodiment will be described with reference to FIGS. 6 and 7.

Figure 6:
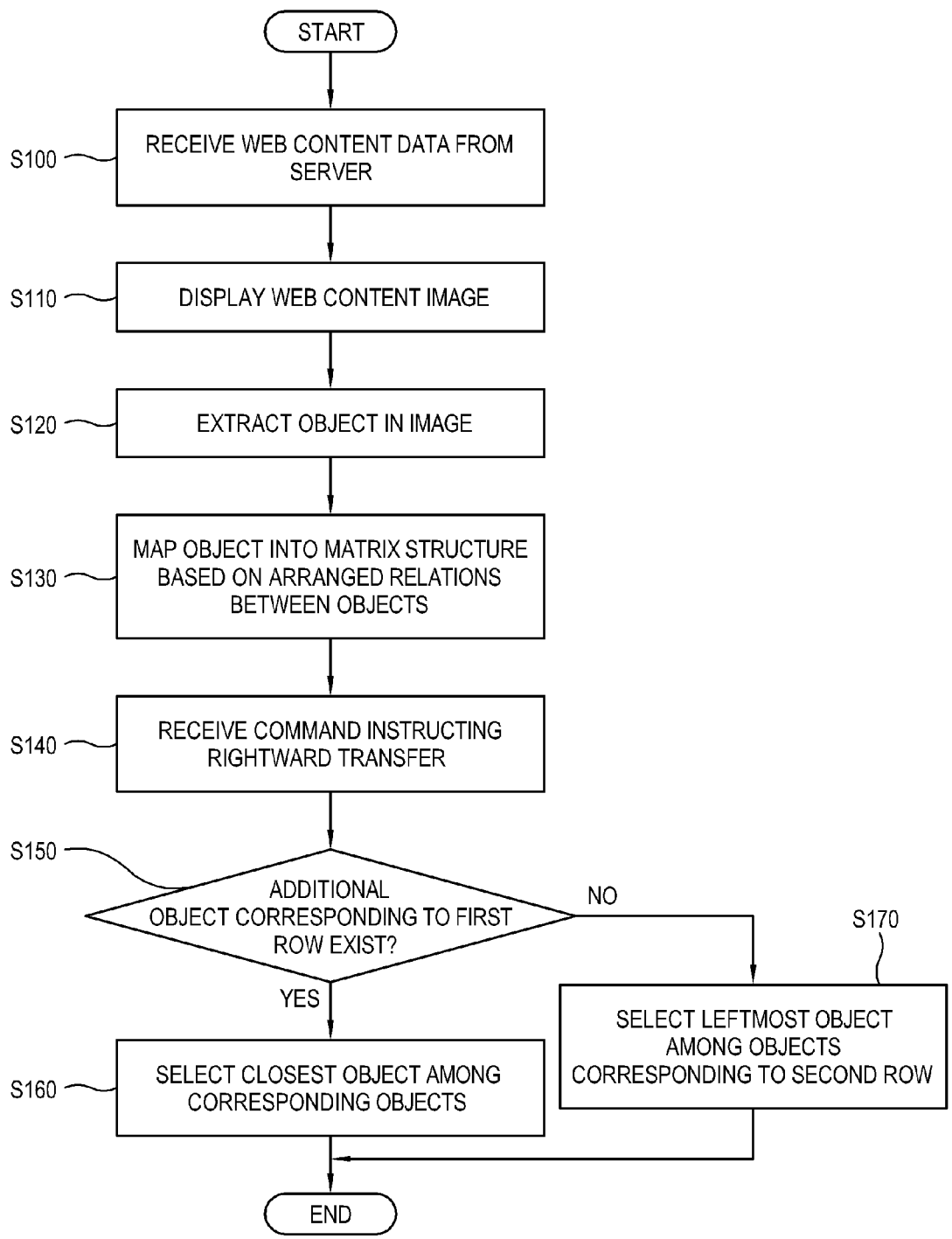
FIG. 6 is a flowchart illustrating a control method of the display apparatus of FIG. 3 based on the rightward transfer command according to an exemplary embodiment.

FIG. 6 is a flowchart illustrating the control method of the display apparatus 1 according to the first exemplary embodiment (refer to FIG. 3).

As shown in FIG. 6, when the display apparatus 1 receives web content data from the server (operation S100), the image processor 200 displays a web content image on the display unit 300 based on the received web content data (operation S110).

The controller 500 extracts an object in the web content image (operation S120), and maps each object in a matrix structure based on arranged relations between extracted objects (operation S130).

Here, when a command instructing a transfer in a right direction is received (operation S140), for example, the controller 500 determines whether there is an additional object corresponding to a first row in the first row corresponding to a first object that is currently selected (operation S150).

When there is an additional object corresponding to the first row, the controller 500 transfers a selection to an object that is the closest to the first object among corresponding objects (operation S160).

However, when there is no additional object corresponding to the first row, the controller 500 transfers the selection to a leftmost object among objects corresponding to a second row downwardly next to the first row (operation S170).

Figure 7:
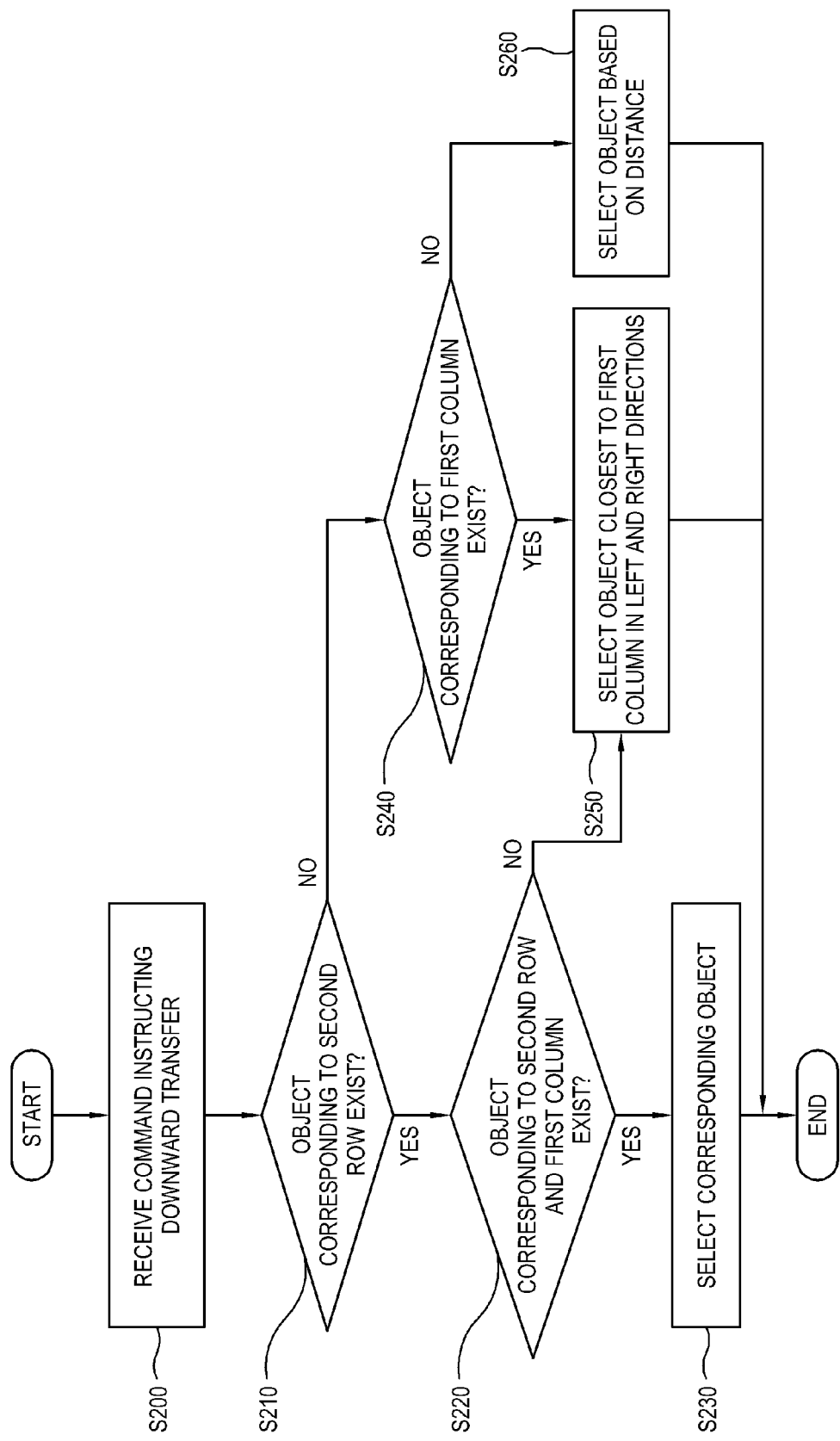
FIG. 7 is a flowchart illustrating a control method of the display apparatus of FIG. 5 based on the downward transfer command according to an exemplary embodiment.

FIG. 7 is a flowchart illustrating a control method of the display apparatus 1 according to the third exemplary embodiment (refer to FIG. 5). In FIG. 7, operations S100 to S130 described above with reference to FIG. 6 are performed the same, and thus an initial state is a state where operations S100 to S130 of FIG. 6 are completed. Further, in the present example, an object selected in the initial state corresponds to a first row and a first column.

As shown in FIG. 7, when a command instructing a transfer in a downward direction is received in the initial state (operation S200), the controller 500 determines whether there is an object mapped corresponding to a second row next to a first row (operation S210). When there is an object corresponding to the second row, the controller 500 determines whether there is an object corresponding to the second row and a first column among the objects (operation S220).

When there is an object corresponding to the second row and the first column, the controller 500 selects the object (operation S230). However, when there is no object corresponding to the second row and the first column, the controller 500 selects an object that is the closest in left and right directions of the first column (operation S250).

When there is no object corresponding to the second row in operation 5230, the controller 500 determines whether there is an object corresponding to the first column (operation S240). When there is an object corresponding to the first column, the controller 500 selects an object that is the closest in left and right directions of the first column (operation S250). For example, when there is a plurality of objects corresponding to the first column, the controller 500 may select an object of which a reference point is the closest to the first column, a reference point being designated to each of the objects. However, the above example is just an illustrative example and may be modified in a variety of ways.

When there is no object corresponding to the first column in operation 5240, the controller 500 selects an object based on a distance (operation S260). That is, the controller 500 may select an object that is the closest to the object selected in the initial state.

While not restricted thereto, exemplary embodiments can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, exemplary embodiments may be written as computer programs transmitted over a computer-readable transmission medium, such as a carrier wave, and received and implemented in general-use or special-purpose digital computers that execute the programs. Moreover, one or more units of the display apparatus 1 and image processing apparatus can include a processor or microprocessor executing a computer program stored in a computer-readable medium.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A display apparatus comprising:
a display unit;
an image receiver which receives an image signal;
an image processor which processes the image signal received by the image receiver and displays an image corresponding to the processed image signal on the display unit; and
a controller which maps a plurality of objects in the image displayed on the display unit corresponding to four directions including up, down, right, and left, and controls the image processor so that a second object corresponding to a same row as a first object is selected, according to the mapped plurality of objects, in response to a first transfer command instructing a transfer in a first direction received through a user input, to a user input unit, of a directional signal corresponding to the first direction with the first object being selected among the plurality of objects, the first direction being one of the right direction and the left direction,
wherein the plurality of objects is mapped corresponding to a plurality of rows based on object sizes, and wherein when the second object being mapped corresponding to a plurality of rows and a second transfer command instructing a transfer in the first direction is received with the second object being selected, the controller selects a third object based on location of the first object, among a plurality of the objects placed in the first direction of the second object.

2. The display apparatus of claim 1, wherein the controller selects a leftmost object among objects corresponding to a second row downwardly adjacent to a first row when there is no object corresponding to the first row, which is the same row as the first object, when the first transfer command is received.

3. The display apparatus of claim 1, wherein the controller selects a fourth object which corresponds to the same row as the first object and is relatively closest to the first object among objects corresponding to a second row next to the first row corresponding to the first object when a third transfer command instructing a transfer in an upward direction or a downward direction is received.

4. The display apparatus of claim 3, wherein the controller sequentially and changeably selects objects which are relatively closest to the fourth object among the objects corresponding to the second row when a fourth transfer command instructing a transfer in a same direction as the third transfer command is received with the fourth object being selected.

5. The display apparatus of claim 1, wherein the image receiver receives web content data from a server, and the image processor displays, on the display unit, a web content image based on the received web content data.

6. The display apparatus of claim 1, further comprising the user input unit comprising up, down, right, and left keys and transmitting a transfer command to the controller based on a manipulation of the up, down, right, and left keys.

7. The display apparatus of claim 6, wherein the user input unit comprises a remote controller.

8. A control method of an image processing apparatus, the control method comprising:
- controlling to display, on a display unit, an image including a plurality of objects;
- mapping the plurality of objects in the image corresponding to four directions including up, down, right, and left; and
- controlling to display, according to the mapped plurality of objects, a selection of a second object corresponding to a same row as a first object in response to a first transfer command instructing a transfer in a first direction received through a user input of a directional signal corresponding to the first direction with the first object being selected among the plurality of objects, the first direction being one of the right direction and the left direction,
- wherein the plurality of objects is mapped corresponding to a plurality of rows based on object sizes, and wherein when the second object being mapped corresponding to a plurality of rows and a second transfer command instructing a transfer in the first direction is received with the second object being selected, the controller selects a third object based on location of the first object, among a plurality of the objects placed in the first direction of the second object.

9. The control method of claim 8, further comprising controlling to display a selection of a leftmost object among objects corresponding to a second row downwardly adjacent to a first row when there is no object corresponding to the first row, which is the same row as the first object, when the first transfer command is received.

10. The control method of claim 8, wherein the controlling to display the selection of the second object comprises controlling to display a selection of a fourth object which corresponds to the same row as the first object and is relatively closest to the first object among objects corresponding to a second row next to the first row corresponding to the first object when a third transfer command instructing a transfer in an upward direction or a downward direction is received.

11. The control method of claim 10, wherein the controlling to display the selection of the fourth object comprises controlling to display a sequential and changeable selection of objects which are relatively closest to the fourth object among the objects corresponding to the second row when a fourth transfer command instructing a transfer in a same direction as the third transfer command is received with the fourth object being selected.

12. The control method of claim 8, wherein the controlling to display the image including the plurality of objects comprises receiving web content data from a server, and controlling to display, on the display unit, a web content image based on the received web content data.

13. The control method of claim 8, wherein the image processing apparatus comprises the display unit.

14. An image processing apparatus comprising:
- an image processor which processes an image signal to be displayed, on a display unit, as an image; and
- a controller which maps a plurality of objects in the image corresponding to four directions including up, down, right, and left, and controls the image processor so that a second object corresponding to a same row as a first object is selected, according to the mapped plurality of objects, in response to a first transfer command instructing a transfer in a first direction received through a user input, to a user input unit, of a directional signal corresponding to the first direction with the first object being selected among the plurality of objects, the first direction being one of the right direction and the left direction,
- wherein the plurality of objects is mapped corresponding to a plurality of rows based on object sizes, and wherein when the second object being mapped corresponding to a plurality of rows and a second transfer command instructing a transfer in the first direction is received with the second object being selected, the controller selects a third object based on location of the first object, among a plurality of the objects placed in the first direction of the second object.

15. The image processing apparatus of claim 14, further comprising the display unit.

* * * * *